US011991472B2

(12) United States Patent
Chuang et al.

(10) Patent No.: US 11,991,472 B2
(45) Date of Patent: May 21, 2024

(54) METHOD FOR PERFORMING IMAGE PROCESSING AND CAPTURING PHOTO FRAME IN PARALLEL

(71) Applicant: ASUSTeK COMPUTER INC., Taipei (TW)

(72) Inventors: Hui-Chi Chuang, Taipei (TW); Jo-Fan Wu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/938,700

(22) Filed: Oct. 7, 2022

(65) Prior Publication Data

US 2023/0156145 A1 May 18, 2023

(30) Foreign Application Priority Data

Nov. 16, 2021 (TW) .................. 110142570

(51) Int. Cl.
*H04N 5/907* (2006.01)
*H04N 23/80* (2023.01)

(52) U.S. Cl.
CPC ............. *H04N 5/907* (2013.01); *H04N 23/80* (2023.01)

(58) Field of Classification Search
CPC ........ H04N 5/907; H04N 23/80; H04N 23/60; H04N 5/772
See application file for complete search history.

(56) References Cited

U.S. PATENT DOCUMENTS 11,477,411 B1 * 10/2022 Harfouche ........... H04N 23/698

FOREIGN PATENT DOCUMENTS

| CN | 104052926 A | 9/2014 |
| CN | 103327252 B | 5/2015 |
| CN | 110278373 A | 9/2019 |

* cited by examiner

*Primary Examiner* — Twyler L Haskins
*Assistant Examiner* — Angel L Garces-Rivera
(74) *Attorney, Agent, or Firm* — McClure, Qualey & Rodack, LLP (57) ABSTRACT

A method for image processing is provided. The method includes: capturing and receiving a first set of photo frames; storing the first set of photo frames into a storage unit; performing image processing on the first set of photo frames; and capturing and receiving a second set of photo frames. The performing image processing on the first set of photo frames and the capturing and receiving the second set of photo frames are performed simultaneously. The performing image processing on the first set of photo frames includes: reading the first set of photo frames from the storage unit; storing the first set of photo frames into a temporary storage unit; performing image processing on the first set of photo frames by using an image processing algorithm; and outputting a first output picture.

9 Claims, 5 Drawing Sheets

METHOD FOR PERFORMING IMAGE PROCESSING AND CAPTURING PHOTO FRAME IN PARALLEL

CROSS-REFERENCE TO RELATED APPLICATION

This application claims the priority benefit of Taiwan application serial No. 110142570, filed on Nov. 16, 2021. The entirety of the above-mentioned patent application is hereby incorporated by reference herein and made a part of the specification.

BACKGROUND OF THE INVENTION

Field of the Invention

The disclosure relates to a method for image processing.

Description of the Related Art

In the conventional method, after the user takes a photo, the camera device temporarily stores the photo frame into the memory after receiving the photo frame, and then the temporary storage frame is inputted for image processing by using the image processing algorithm. However, the user is required to wait until the result frame is outputted and a picture is finally generated after the processing is completed, and then continues taking photos. The process often requires a relatively long processing time and a large memory space, causing the user to be impatient after waiting for a long time and affecting the system performance.

BRIEF SUMMARY OF THE INVENTION

According to the first aspect of the disclosure, a method for image processing is provided. The method includes: capturing and receiving a first set of photo frames; storing the first set of photo frames into a storage unit; and performing image processing on the first set of photo frames. The performing image processing on the first set of photo frames includes: reading the first set of photo frames from a storage unit; storing the first set of photo frames into a temporary storage unit; performing image processing on the first set of photo frames by using an image processing algorithm, and simultaneously capturing and receiving a second set of photo frames; and outputting a first output picture.

According to the second aspect of the disclosure, an another method for image processing is provided, The method includes: capturing and receiving a first set of photo frames; storing the first set of photo frames according to a size of the first set of photo frames and a capacity of a temporary storage unit; performing image processing on the first set of photo frames; and capturing and receiving a second set of photo frames. The second set of photo frames is captured and received when the image processing is performed on the first set of photo frames. The storing the first set of photo frames according to a size of the first set of photo frames and a capacity of a temporary storage unit includes: determining whether the capacity of the temporary storage unit is sufficient to store the first set of photo frames; and storing the first set of photo frames into the temporary storage unit when the capacity of the temporary storage unit is sufficient to store the first set of photo frames, where the temporary storage unit is coupled to an arithmetic unit, and the arithmetic unit is configured to access the temporary storage unit and perform image processing.

BRIEF DESCRIPTION OF THE DRAWINGS

To make the foregoing and other objectives, features, advantages, and embodiments of the disclosure more comprehensible, the accompanying drawings are as follows.

DETAILED DESCRIPTION OF THE EMBODIMENTS

Figure 1:
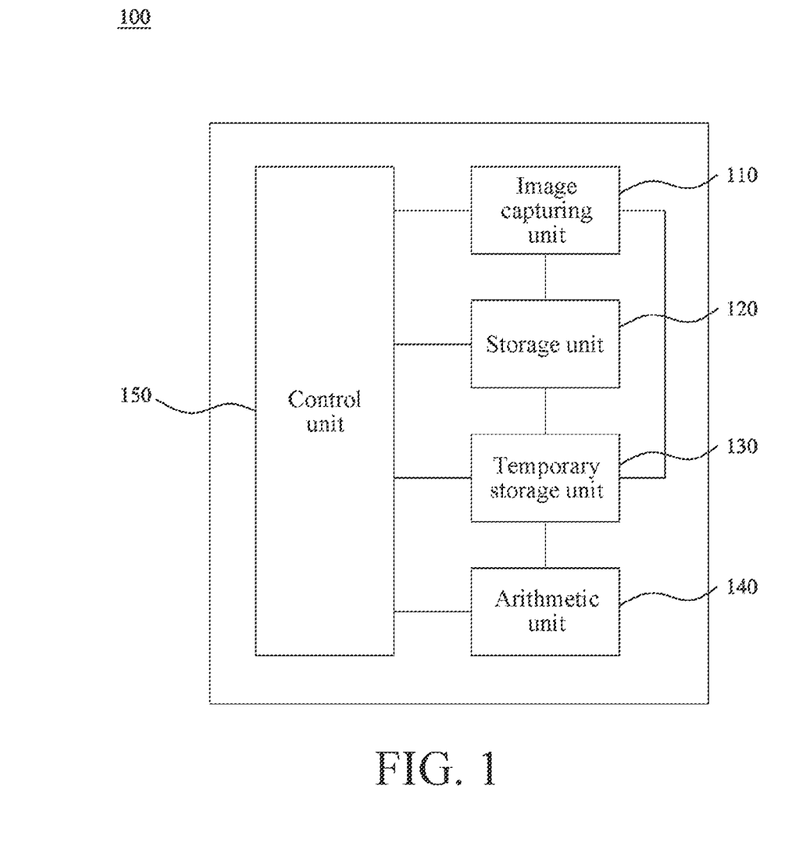
FIG. 1 is a schematic diagram of a camera device according to an embodiment of the disclosure.

Refer to FIG. 1. In an embodiment, the embodiment of the method for image processing disclosed in the disclosure is performed by a camera device 100. It should be noted that the camera device 100 is not used to limit the method for image processing of the disclosure. Those with ordinary knowledge in the related art should be able to use a camera device similar to the camera device 100 or other common camera devices to perform the method for image processing of the disclosure. The camera device 100 is only used as an example.

In an embodiment, the camera device 100 includes an image capturing unit 110, a storage unit 120, a temporary storage unit 130, an arithmetic unit 140, and a control unit 150. The image capturing unit 110 is configured to take pictures and receive images, and is coupled to the storage unit 120, the temporary storage unit 130, and the control unit 150. The storage unit 120 is configured to store images. In an embodiment, the storage unit 120 is a hard disk, a flash memory, a flash card, an embedded multimedia card (eMMC), or the like. The temporary storage unit 130 is configured to store images and for the arithmetic unit 140 to access for subsequent image processing. In an embodiment, the temporary storage unit 130 is a memory or a cache memory. Generally, the read/write speed of the temporary storage unit 130 is higher than that of the storage unit 120, but the storage capacity of the temporary storage unit 130 is less than that of the storage unit 120. In other words, in an embodiment, the storage unit 120 includes a relatively large storage space and a relatively low read-write speed, and the temporary storage unit 130 includes a relatively small storage space and a relatively high read-write speed. Therefore, in an embodiment, the image is first stored into the storage unit 120 including a relatively large storage space, and then the image is stored into the temporary storage unit 130 including a relatively high read-write speed during the image processing. The relevant details will be described later. The arithmetic unit 140 is configured to access the image in the temporary storage unit 130, perform image processing on the image by using an image processing algorithm, and output the image on which the image processing is performed. The control unit 150 is configured to give instructions to the image capturing unit 110, the storage unit 120, the temporary storage unit 130, and the arithmetic unit 140. In this way, the image capturing unit, the storage unit, the temporary storage unit, and the arithmetic unit perform functions such as photographing, storage, and calculation according to a specific process. The method for image processing of the disclosure is implemented by controlling the image capturing unit 110, the storage unit 120, the temporary storage unit 130, and the arithmetic unit 140 by the control unit 150.

Figure 2:
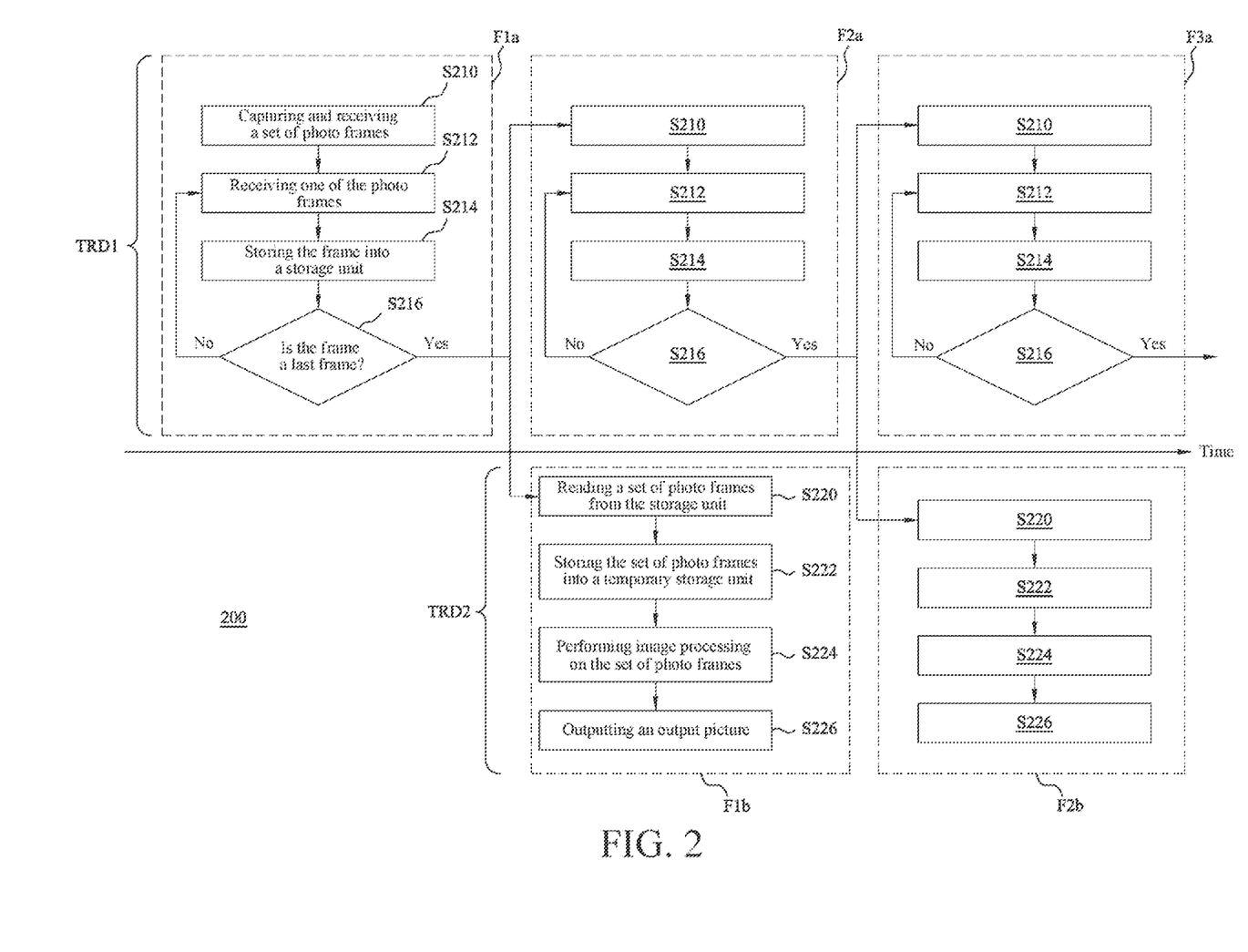
FIG. 2 is a flowchart of a method for image processing according to an embodiment of the disclosure.
Figure 3:
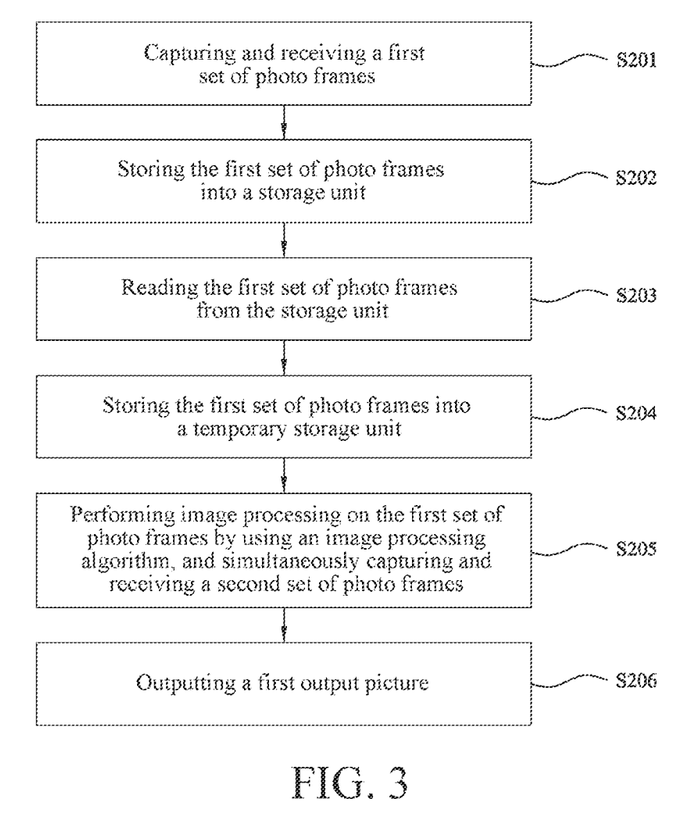
FIG. 3 is an overall flowchart of a method for image processing according to an embodiment of the disclosure.

The following paragraphs describe how the method for image processing of the disclosure is performed by the camera device 100. Refer to FIG. 1, FIG. 2, and FIG. 3 together. In an embodiment, step S201 in the method 200 for image processing is capturing and receiving a first set of photo frames, step S202 is storing the first set of photo frames into the storage unit, step S203 is reading the first set of photo frames from the storage unit, step S204 is storing the first set of photo frames into the temporary storage unit, step S205 is performing image processing on the first set of photo frames by using an image processing algorithm, and simultaneously capturing and receiving a second set of photo frames, and step S206 is outputting the first output picture. In addition, the method 200 for image processing further includes steps S210, S212, S214, and S216 for image capturing, and steps S220, S222, S224, and S226 for image processing, and steps S210-S226 are to be repeatedly performed for different sets of photo frames.

Referring to FIG. 2, in an embodiment, the arithmetic unit 140 includes at least two threads: a first thread TRD1 and a second thread TRD2 that are capable of independently performing parallel computing. The first thread TRD1 is configured to sequentially perform a capturing operation F1a of the first set of photo frames, a capturing operation F2a of the second set of photo frames, and a capturing operation F3a of a third set of photo frames. The second thread TRD2 is configured to sequentially perform an image processing operation F1b of the first set of photo frames and an image processing operation F2b of the second set of photo frames. That is to say, the method 200 for image processing is used to cause the reception and the image processing of the photo frames to be performed by the first thread TRD1 and the second thread TRD2 respectively. A next set of photo frames is captured without the need to wait until the image processing is completed, thereby achieving the effect of parallel computing and saving the waiting time of the user.

As shown in FIG. 2, when the first thread TRD1 completes performing the capturing operation F1a of the first set of photo frames (that is to say, when it is determined that the frame is a last frame in step S216 of the capturing operation F1a of the first set of photo frames, the details are to be described later), the first thread TRD1 starts to perform the capturing operation F2a of the second set of photo frames. At the same time, the second thread TRD2 simultaneously performs the image processing operation F1b of the first set of photo frames. That is to say, as shown in a time axis in FIG. 2, there is no need to wait until the image processing operation F1b is completed before the capturing operation F2a of the second set of photo frames is started.

Similarly, in the capturing operation F3a of the third set of photo frames and the image processing operation F2b of the second set of photo frames in FIG. 2, after the second set of photo frames is captured and received according to the method 200 for image processing, the second set of photo frames is synchronously processed and the third set of photo frames is captured, according to the foregoing method.

The capturing operation F1a of the first set of photo frames and the image processing operation F1b of the first set of photo frames are described below, and then an overall description is given to the operations in the method 200 for image processing.

In the capturing operation F1a of the first set of photo frames in FIG. 2, step S210 is capturing and receiving the first set of photo frames. Step S210 is performed by the image capturing unit 110. In an embodiment, the first set of photo frames includes a plurality of photo frames. In detail, the image capturing unit 110 actually captures several photos in one shutter. These photos are the so-called photo frames in the disclosure. The purpose is to perform image processing on a plurality of photo frames and generate the final output picture with better presentation or specific effects, in an embodiment, expanding the dynamic range of the image, performing de-noise processing, or the like. It should be noted that there are a large number of purposes and methods for image processing. The above examples are not intended to limit the content of the disclosure. Those with ordinary knowledge in the related art use different methods for image processing in combination with the method for image processing of the disclosure.

Then, the first set of photo frames is stored into the storage unit 120. In an embodiment, as shown in the capturing operation F1a of the first set of photo frames in FIG. 2, each of the first set of photo frames is stored into the storage unit 120 one by one. In this embodiment, the method 200 for image processing first receives one frame of the first set of photo frames (that is, step S212), stores the photo frame into the storage unit 120 (that is, step S214), and then determines whether the photo frame is a last frame of the first set of photo frames (that is, step S216). when the photo frame is not the last frame of the first set of photo frames, a next photo frame is received and stored into the storage unit 120, and it is determined again whether the photo frame is the last frame (that is, as indicated by a path of "No" in F1a in FIG. 2, return to step S212 from step S216). According to the method, each of the first set of photo frames is stored and determined one by one until all of the photo frames are stored into the storage unit 120.

When a photo frame is determined to be the last frame of the first set of photo frames, it indicates that the first set of photo frames has been stored into the storage unit 120. At this point, the method 200 for image processing proceeds to the step of performing image processing on the first set of photo frames, and capturing and receiving the second set of photo frames (that is, as indicated by a path of "Yes" in F1a in FIG. 2, the method proceeds from step S216 in the capturing operation F1a of the first set of photo frames to step S212 of the capturing operation F2a of the second set of photo frames and step S220 of the image processing operation F1b of the first set of photo frames). As described above, before the image processing operation F1b of the first set of photo frames is completed, the capturing operation F2a of the second set of photo frames of the method 200 for image processing is started.

In the image processing operation F1b of the first set of photo frames, step S220 and step S222 are reading the first set of photo frames stored into the storage unit 120, and storing the first set of photo frames into the temporary storage unit 130. Next, step S224 is performed. The arithmetic unit 140 accesses the first set of photo frames stored in the temporary storage unit 130, performs image processing on the first set of photo frames by using an image processing algorithm, and finally performs step S226 to output the first output picture after the image processing.

In an embodiment, after the arithmetic unit 140 outputs the first output picture, the control unit 150 gives instructions to delete the first set of photo frames from the temporary storage unit 130 and the storage unit 120. In this way, the temporary storage unit 130 and the storage unit 120 are cleared for receiving the second set of photo frames.

Figure 4:
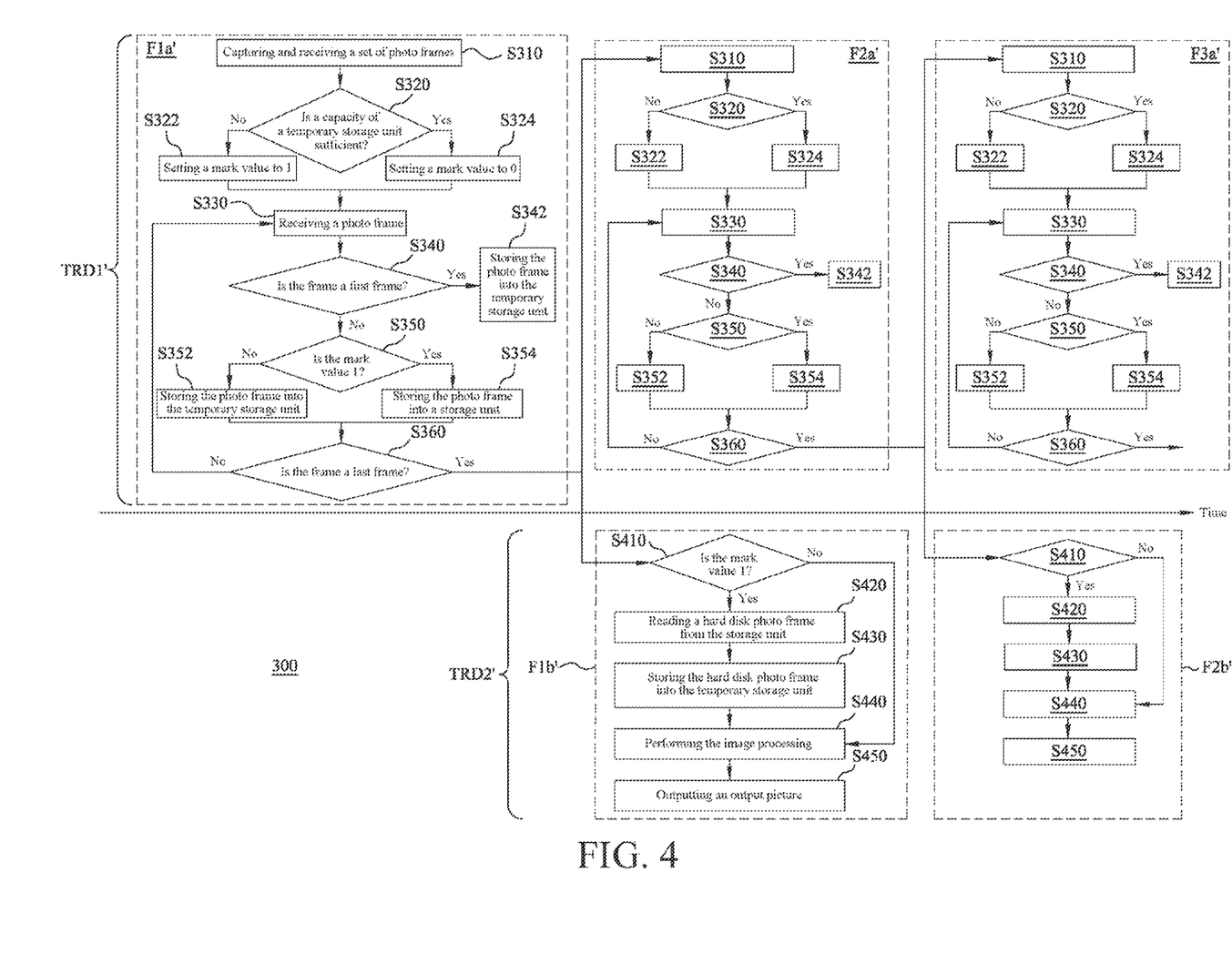
FIG. 4 is a flowchart of a method for image processing according to an embodiment of the disclosure.
Figure 5:
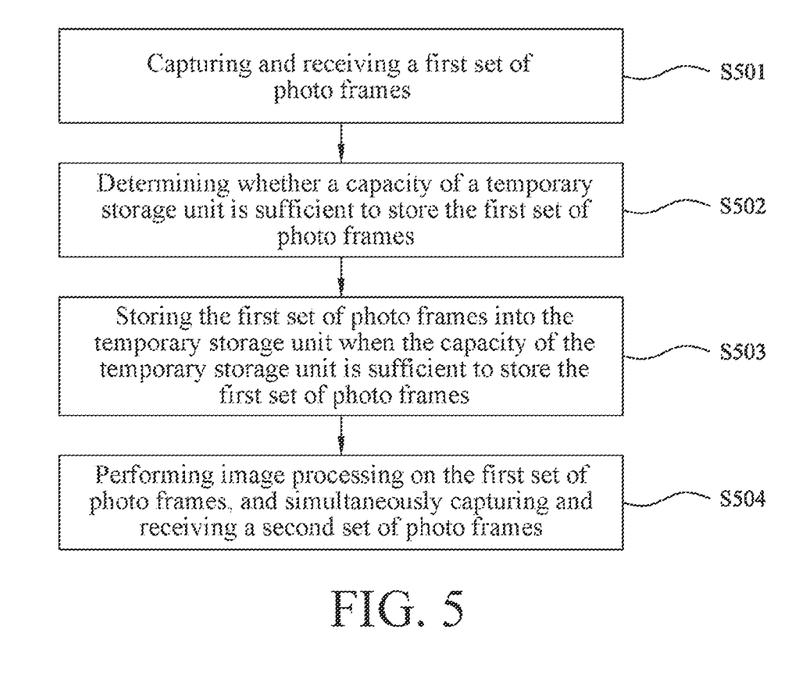
FIG. 5 is an overall flowchart of a method for image processing according to an embodiment of the disclosure.

The following paragraphs describe a method for image processing according to another embodiment of the disclosure. Refer to FIG. 1, FIG. 4, and FIG. 5 together. In an embodiment, the method 300 for image processing is shown in FIG. 5. Step S501 is capturing and receiving the first set of photo frames, step S502 is determining whether a capacity of the temporary storage unit is sufficient to store the first set of photo frames, step S503 is storing the first set of photo frames into the temporary storage unit when the capacity of the temporary storage unit is sufficient to store the first set of photo frames, and step S504 is performing image processing on the first set of photo frames, and simultaneously capturing and receiving the second set of photo frames. In addition, the method 300 for image processing further includes steps S310, S320, S322, S324, S330, S340, S342, S350, S352, S354, and S360 for image capturing in FIG. 4, and steps S410, S420, S430, S440, and S450 for image processing. However, steps S310-S450 are to be repeatedly performed for different sets of photo frames.

Referring to FIG. 4, in an embodiment, the arithmetic unit 140 includes at least two threads: a first thread TRD1' and a second thread TRD2' that are capable of independently performing parallel computing. The first thread TRD1' is configured to sequentially perform a capturing operation F1$a$' of the first set of photo frames, a capturing operation F2$a$' of the second set of photo frames, and a capturing operation F3$a$' of the third set of photo frames. The capturing operation F1$a$' of the first set of photo frames, the capturing operation F2$a$' of the second set of photo frames, and the capturing operation F3$a$' of the third set of photo frames all include steps S310-S360. The second thread TRD2' is configured to sequentially perform an image processing operation F1$b$' of the first set of photo frames and an image processing operation F2$b$' of the second set of photo frames. The image processing operation F1$b$' of the first set of photo frames and the image processing operation F2$b$' of the second set of photo frames both include steps S410-S450.

On the whole, the method 300 for image processing is used to cause the reception and the image processing of the photo frames to be performed by the first thread TRD1' and the second thread TRD2' respectively. A next set of photo frames is captured without the need to wait until the image processing is completed. As shown in FIG. 4, when the first thread TRD1' completes the capturing operation F1$a$' of the first set of photo frames (that is to say, when it is determined, in step S360 of the capturing operation F1$a$' of the first set of photo frames, that the frame is the last frame, details are to be described later), the first thread TRD1' starts to perform the capturing operation F2$a$' of the second set of photo frames, and the second thread TRD2' simultaneously performs the image processing operation F1$b$' of the first set of photo frames. That is to say, as shown in the time axis in FIG. 4, there is no need to wait until the image processing operation F1$b$' is completed before the capturing operation F2$a$' of the second set of photo frames is started.

The capturing operation F1$a$' of the first set of photo frames and the image processing operation F1$b$' of the first set of photo frames are described below.

In the capturing operation F1$a$' of the first set of photo frames in FIG. 4, step S310 is capturing and receiving the first set of photo frames. Step S310 is performed by the image capturing unit 110. In an embodiment, the first set of photo frames includes a plurality of photo frames. Next, the first set of photo frames is stored according to a size of the first set of photo frames and the capacity of the temporary storage unit 130. First, it is determined whether the capacity of the temporary storage unit 130 is sufficient to store the first set of photo frames (that is, step S320). When the temporary storage unit 130 is sufficient to store the first set of photo frames, the first set of photo frames is directly stored into the temporary storage unit 130 by using the coupling relationship between the image capturing unit 110 and the temporary storage unit 130. The arithmetic unit 140 is allowed to directly access the temporary storage unit 130 for image processing without the need to first store the first set of photo frames into the storage unit 120. When the image processing is to be performed, the first set of photo frames is read and stored into the temporary storage unit 130.

Then, when the capacity of the temporary storage unit 130 is sufficient to store the first set of photo frames, the first set of photo frames is stored into the temporary storage unit 130. In an embodiment, in the method 300 for image processing, a mark value is set to 0 when the capacity of the temporary storage unit 130 is sufficient to store the first set of photo frames (that is, step S324), and the mark value is set to 1 when the capacity of the temporary storage unit 130 is insufficient to store the first set of photo frames (that is, step S322). The method of determining the mark value is still used in a plurality of steps in the method 300 for image processing to facilitate the storage and image processing of subsequent photo frames.

In this embodiment, after the mark value is set, the method 300 for image processing proceeds to the step of storing each frame of the first set of photo frames, storing the first frame of the first set of photo frames into the temporary storage unit 130, and determining, according to the value of the mark value (that is, depending on whether the capacity of the temporary storage unit 130 is sufficient), that other frames other than the first frame are to be stored in the temporary storage unit 130 or the storage unit 140. First, one frame of the first set of photo frames is received (that is, step S330), and it is determined whether the photo frame is the first frame of the first set of photo frames (that is, step S340). If so, the photo frame is stored into the temporary storage unit 130 (that is, step S342). If not, it is determined whether the mark value is 1 (that is, step S350). If so, the photo frame is stored into the storage unit 120 (that is, step S354). If not, the photo frame is stored into the temporary storage unit 130 (that is, step S352). The first frame of the first set of photo frames is bound to be stored into the temporary storage unit 130. When the mark value is 0, the remaining frames in the first set of photo frames are stored into the temporary storage unit 130. When the mark value is 1, the remaining frames are stored into the storage unit 120. In other words, when the capacity of the temporary storage unit 130 is sufficient to store the first set of photo frames, all photo frames in the first set of photo frames are to be stored into the temporary storage unit 130 (the first frame of the first set of photo frames is to be stored into the temporary storage unit 130 in step S342, and the remaining frames of the first set of photo frames are to be stored into the temporary storage unit 130 in step S352).

In this embodiment, after one frame of the first set of photo frames is stored, it is determined whether the photo frame is the last frame of the first set of photo frames (that is, step S360). When the photo frame is not the last frame of the first set of photo frames, a next photo frame is received and stored into the storage unit 120 or the temporary storage unit 130, and it is determined again whether the photo frame is the last frame (that is, as indicated by a path of "No" in step S360 in FIG. 4, return to step S330 from step S360). According to the method, each of the first set of photo frames is stored and determined one by one until all of the photo frames are stored into the storage unit 120 or the temporary storage unit 130. When a photo frame is determined to be the last frame of the first set of photo frames, it indicates that the first set of photo frames has been stored into the storage unit 120 or the temporary storage unit 130. At this point, the method 300 for image processing proceeds to the step of starting performing image processing on the first set of photo frames, and capturing and receiving the second set of photo frames (that is, as indicated by a path of "Yes' in step S360 in FIG. 4, the method proceeds from step S360 in the capturing operation F1$a'$ of the first set of photo frames to step S310 of the capturing operation F2$a'$ of the second set of photo frames and step S410 of the image processing operation F1$b'$ of the first set of photo frames by the second tread TRD2'). As described above, before the image processing operation F1$b'$ of the first set of photo frames is completed, the capturing operation F2$a'$ of the second set of photo frames of the method 300 for image processing is started.

The image processing performed on the first set of photo frames by using the method 300 for image processing is described below, that is, the image processing operation F1$b'$ of the first set of photo frames in FIG. 4. In an embodiment, the image processing operation F1$b'$ of the first set of photo frames includes: determining whether the mark value is 1 (that is, step 410); reading a hard disk photo frame from the storage unit 120 (that is, step 420) when the mark value is 1, where the hard disk photo frame is the photo frame stored in the storage unit 120; storing the hard disk photo frame into the temporary storage unit 130 (that is, step 430); and performing image processing on the hard disk photo frame and the first frame of the first set of photo frames (which is also referred to as the first photo frame) by using an image processing algorithm (that is, step 440). When the mark value is 1, it indicates that the capacity of the temporary storage unit 130 is insufficient to store the first set of photo frames. According to step S354, the photo frame is to be stored into the storage unit 120. Therefore, before the image processing, it is necessary to read the photo frame stored in the storage unit 120 (that is, the hard disk photo frame described above), and store the hard disk photo frame into the temporary storage unit 130. In this way, the arithmetic unit 140 accesses the subsequent photo frames and performs image processing by using the coupling relationship between the arithmetic unit 140 and the temporary storage unit 130.

In an embodiment, when it is determined, in step S410, that the mark value is 0, it indicates that the capacity of the temporary storage unit 130 is sufficient to store the first set of photo frames and all photo frames in the first set of photo frames are stored into the temporary storage unit 130. Therefore, at this point, the arithmetic unit 140 directly accesses the first set of photo frames stored in the temporary storage unit 130, and performs image processing on the first set of photo frames by using the image processing algorithm. This process is indicated by "No" in step S410 in FIG. 4, and directly proceeds from step S410 to step S440.

The method 300 for image processing proceeds to step S450 of outputting the first output picture after the image processing. In an embodiment, when an abnormality occurs during the reading of the hard disk photo frame from the storage unit 120 (that is, step S420) or during the image processing by using the image processing algorithm (that is, step S440), or the hard disk photo frame is unreadable, the arithmetic unit 140 directly outputs the first photo frame stored in the temporary storage unit 130 as the first output picture. In steps S340 and S342, the first photo frame is stored into the temporary storage unit 130. That is to say, when the abnormality occurs during the reading or image processing or the hard disk photo frame is unreadable, the first photo frame stored in the temporary storage unit 130 is directly outputted as the first output picture.

Based on the above, according to the method 300 for image processing, it is determined, according to the capacity of the temporary storage unit 130 and the size of a set of photo frames, that the photo frames are to be stored into the temporary storage unit 130 or the storage unit 120, to facilitate the subsequent image processing. According to the method 300 for image processing, the receiving and the image processing of the photo frames are respectively performed by the first thread TRD1' and the second thread TRD2'. Upon completion of the capturing operation F1$a'$ of the first set of photo frames, the first thread TRD1' continues to perform the capturing operation F2$a'$ of the second set of photo frames in the first thread TRD1'. Then, upon completion of the capturing operation F2$a'$ of the second set of photo frames, the first thread TRD1' continues to perform the capturing operation F3$a'$ of the third set of photo frames in the first thread TRD1'. By analogy, upon completion of the capturing operation F3$a'$ of the third set of photo frames, the user needs to continue perform capturing before the image processing is completed, thereby saving the operation time of the image processing.

Although the disclosure is described with reference to the above embodiments, the embodiments are not intended to limit the disclosure. A person of ordinary skill in the art makes variations and improvements without departing from the spirit and scope of the disclosure. Therefore, the protection scope of the disclosure should be subject to the appended claims.

What is claimed is:

1. A method for image processing, comprising:
   capturing and receiving a first set of photo frames;
   storing the first set of photo frames into a storage unit; and
   performing image processing on the first set of photo frames, comprising:
   reading the first set of photo frames from the storage unit;
   storing the first set of photo frames into a temporary storage unit;
   performing image processing on the first set of photo frames by using an image processing algorithm, and simultaneously capturing and receiving a second set of photo frames; and
   outputting a first output picture, wherein the storage unit where the first set of photo frames and the second set of photo frames are stored comprises a relatively large storage space and a relatively low read-write speed, and the temporary storage unit where the first set of photo frames is stored during the image processing comprises a relatively small storage space and a relatively high read-write speed.

2. The method for image processing according to claim 1, wherein the first set of photo frames comprises a plurality of photo frames, and the storing the first set of photo frames into a storage unit further comprises:
   receiving at least one of the photo frames;
   storing the at least one photo frame into the storage unit; and
   determining whether the at least one photo frame is a last frame of the first set of photo frames, and if not, receiving a next one of the photo frames and storing the next photo frame into the storage unit until it is determined that the at least one photo frame is the last frame of the first set of photo frames and has been stored into the storage unit.

3. The method for image processing according to claim 2, wherein the image processing is performed on the first set of photo frames in the temporary storage unit by using the image processing algorithm, and the second set of photo frames is simultaneously captured and stored into the storage unit.

4. The method for image processing according to claim 1, wherein the performing image processing on the first set of photo frames further comprises:
deleting the first set of photo frames from the temporary storage unit and the storage unit after the first output picture is outputted.

5. A method for image processing, comprising:
capturing and receiving a first set of photo frames;
storing the first set of photo frames according to a size of the first set of photo frames and a capacity of a temporary storage unit, comprising:
determining whether the capacity of the temporary storage unit is sufficient to store the first set of photo frames; and
storing the first set of photo frames into the temporary storage unit when the capacity of the temporary storage unit is sufficient to store the first set of photo frames, wherein the temporary storage unit is coupled to an arithmetic unit, and the arithmetic unit is configured to access the temporary storage unit and perform image processing;
performing image processing on the first set of photo frames; and
capturing and receiving a second set of photo frames, wherein the second set of photo frames is captured and received before the image processing on the first set of photo frames is completed.

6. The method for image processing according to claim 5, wherein the first set of photo frames comprises a plurality of photo frames, and the storing the first set of photo frames according to a size of the first set of photo frames and a capacity of a temporary storage unit further comprises:
setting a mark value to 0 when the capacity of the temporary storage unit is sufficient to store the first set of photo frames; or
setting the mark value to 1 when the capacity of the temporary storage unit is insufficient to store the first set of photo frames; and
receiving and storing at least one of the photo frames, comprising:
determining whether the at least one photo frame is a first frame of the first set of photo frames, and if so, storing the first photo frame into the temporary storage unit;
determining whether the mark value is 1, if so, storing the at least one photo frame into a storage unit as a hard disk photo frame, or if not, storing the at least one photo frame into the temporary storage unit; and
determining whether the at least one photo frame is a last frame of the first set of photo frames, and if not, receiving and storing a next one of the photo frames until it is determined that the at least one photo frame is the last frame of the first set of photo frames and has been stored in the storage unit or the temporary storage unit.

7. The method for image processing according to claim 6, wherein the performing image processing on the first set of photo frames further comprises:
reading the hard disk photo frame from the storage unit, and storing the hard disk photo frame into the temporary storage unit;
performing image processing on the hard disk photo frame and the first photo frame by using an image processing algorithm; and
outputting a first output picture.

8. The method for image processing according to claim 7, wherein the performing image processing on the first set of photo frames further comprises:
outputting the first photo frame stored in the temporary storage unit as the first output picture when an abnormality occurs or the hard disk photo frame is unreadable during the reading of the hard disk photo frame from the storage unit or during the image processing by using the image processing algorithm.

9. The method for image processing according to claim 6, wherein the performing image processing on the first set of photo frames further comprises:
performing image processing on the first set of photo frames by using an image processing algorithm when the mark value is 0; and
outputting a first output picture, wherein
the first photo frame stored in the temporary storage unit is outputted as the first output picture when an abnormality occurs during the image processing by using the image processing algorithm.

* * * * *